United States Patent [19]
Satoh et al.

[11] Patent Number: 5,961,612
[45] Date of Patent: Oct. 5, 1999

[54] FRONT-END PROCESSOR WITH NOTIFICATION AND INITIALIZATION MEANS

[75] Inventors: Kenji Satoh; Shinichi Ando; Shinichi Doi, all of Tokyo, Japan

[73] Assignee: NEC Corporation, Tokyo, Japan

[21] Appl. No.: 08/847,501

[22] Filed: Apr. 25, 1997

[30] Foreign Application Priority Data

Apr. 26, 1996 [JP] Japan .................................. 8-107584

[51] Int. Cl.$^6$ ............................. G06F 13/10; G06F 9/445; G06F 17/30
[52] U.S. Cl. .................................. 710/10; 713/1; 707/4; 707/200
[58] Field of Search ...................... 395/885, 500, 395/830, 884; 341/23; 364/900, 200; 710/10; 707/4, 200; 713/1

[56] References Cited

U.S. PATENT DOCUMENTS

| | | | |
|---|---|---|---|
| 5,628,030 | 5/1997 | Tuckner | 395/884 |
| 5,644,736 | 7/1997 | Healy et al. | 395/341 |
| 5,742,746 | 4/1998 | Doi et al. | 395/115 |
| 5,764,983 | 6/1998 | Chew et al. | 395/682 |
| 5,786,776 | 7/1998 | Kisaichi et al. | 341/23 |

FOREIGN PATENT DOCUMENTS

| | | |
|---|---|---|
| 62-175860 | 8/1987 | Japan . |
| 64-37613 | 2/1989 | Japan . |
| 9-114819 | 5/1997 | Japan . |

*Primary Examiner*—Thomas C. Lee
*Assistant Examiner*—Ilwoo Park
*Attorney, Agent, or Firm*—Foley & Lardner

[57] ABSTRACT

In order to provide a front-end processor wherein additional functions for retrieving external resources can be easily supplemented optionally without user's complicated environment setting, a front-end processor of the invention, having a main processing section (2) and retrieval sections (4) controlled through the main processing section, comprises: notification means (10) provided in each of the retrieval sections for transmitting initialization information to the main processing section when a file of said each of the retrieval sections is deployed in a main memory area; and initialization means (7) provided in the main processing section for initializing default environments of the front-end processor according to the initialization information transmitted from each of the retrieval sections.

5 Claims, 5 Drawing Sheets

FIG.2

| START KEY | Ctrl + H |
|---|---|
| FUNCTION NAME | 用例検索 |
| ICON | 用例 |

FIG. 4

| | |
|---|---|
| START KEY | Ctrl + E |
| FUNCTION NAME | 慣用例文検索 |
| ICON | 慣用 |
| INPUT INFORMATION LAYER LEVEL | SENTENCE + PART OF SPEECH |
| RETURN FLAG | ON |
| OUTPUT INFORMATION LAYER LEVEL | SENTENCE |

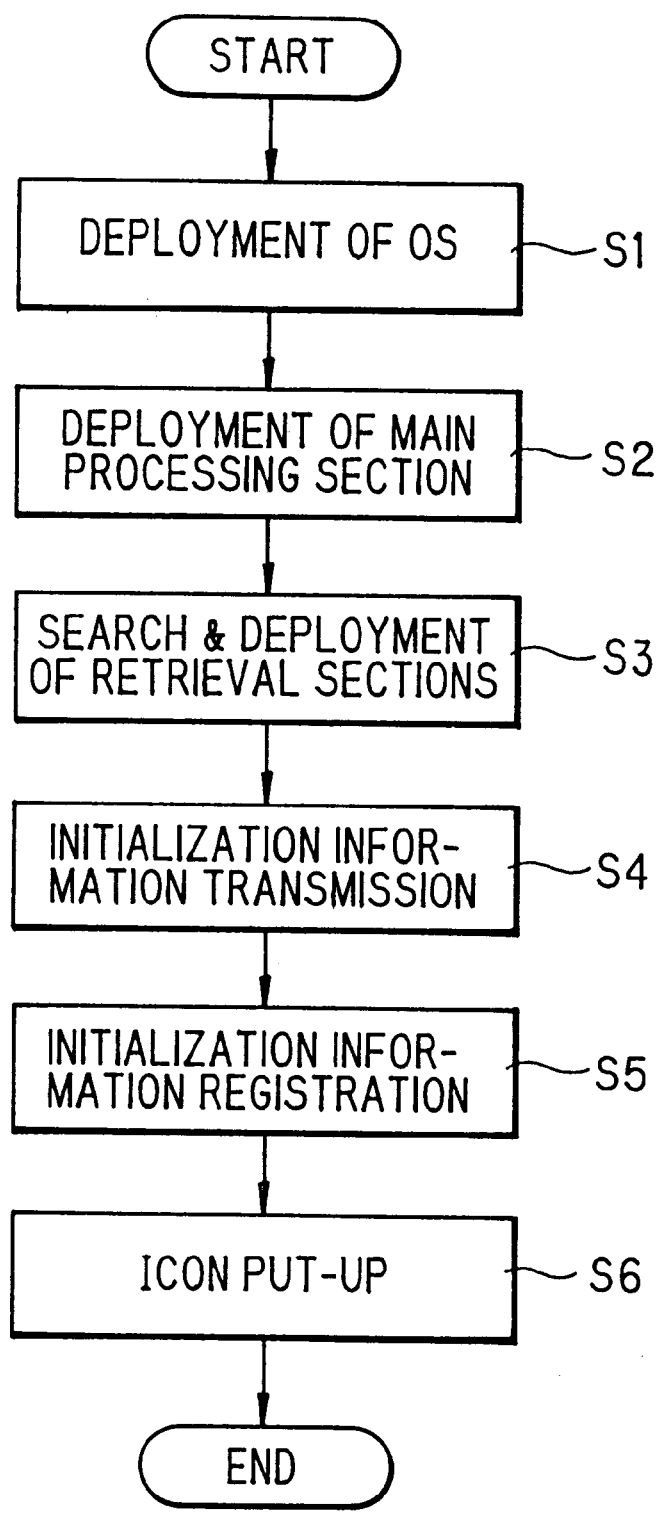

FRONT-END PROCESSOR WITH NOTIFICATION AND INITIALIZATION MEANS

BACKGROUND OF THE INVENTION

The present invention relates to a computer program called a front-end processor which is executed on a platform provided in an OS (Operating System) for converting code strings entered through an input device into another code strings, such as those for expressing Japanese characters, to be supplied to an application program by way of the OS, and more particularly to that easy to be supplemented with additional functions, for example, to retrieve external resources such as a wording example database or a technical dictionary provided on a CD-ROM (Compact Disk Read Only Memory).

The front-end processor is used for enabling an easy input of characters other than the alphabet and a standard architecture, namely a platform, for the front-end processor is prepared in many operating systems. For example, the IME (Input Method Editor) provided with and operating on the Windows (registered trade mark of Microsoft Corporation in USA) system is a platform for the front-end processor, and various front-end processors conforming to the platform are developed by software providers.

Many of the front-end processors are specialized for a unique function, Japanese character conversion, for instance, but there are some front-end processors provided with additional functions to retrieve external resources for enabling users to obtain supplementary information incident to their basic function. An example of them is disclosed in a Japanese patent application laid open as a Provisional Publication No. 175860/'87 entitled "Japanese Character Converter", wherein is added a function for retrieving a wording dictionary in order to prevent users' mis-wording with homophones. In another Japanese patent application laid open as a Provisional Publication No. 37613/'89 entitled "A Help Method for Electronic Apparatus", a front-end processor provided with an on-line-help function is disclosed.

These conventional front-end processors having additional functions for retrieving external resources can be grouped into two types, those which make use of their own build-in functions for the external resource retrieval, and those where users must beforehand install functions to be used among several retrieving functions prepared by the provider.

In these conventional front-end processors, however, there are left some inconveniences that available additional functions are predetermined without consideration of optional extension, in the former type, and so, it is difficult to assign different start icons for different functions or to set different data communication levels for different functions, even though different external resources may be applied in turn, or that a fairly complicated environment setting is forced to users, in the latter type, such as retrieval start key assignment for each of the external resources to be applied in case they are to be retrieved by way of key-inputs, for example.

SUMMARY OF THE INVENTION

Therefore, a primary object of the present invention is to provide a front-end processor wherein additional functions for retrieving external resources can be easily supplemented optionally without user's complicated environment setting, enabling as well to assign different icons for different functions and to set different data communication levels for different functions.

In order to achieve the object, a front-end processor of the invention having a main processing section and at least one retrieval section controlled through the main processing section, comprises:

notification means provided in each of said at least one retrieval section for transmitting initialization information to the main processing section when a file of said each of said at least one retrieval section is deployed in a main memory area of a computer; and initialization means provided in the main processing section for initializing default environments of the front-end processor according to the initialization information transmitted from each of said at least one retrieval section.

The initialization information of each of said at least one retrieval section includes information concerning:

a start key to be entered through an input device of the computer for the main processing section activating said each of said at least one retrieval section;

bit map data of an icon to be clicked by an pointing device of the computer for the main processing section activating said each of said at least one retrieval section; and a function name to be displayed for identifying said each of said at least one retrieval section.

Further, said at least one retrieval section is filed with a specific extension name or in a specific directory of a tree-structural filing system to be identified and deployed by the main processing section.

Therefore, retrieval sections having desired additional functions can be easily supplemented, or replace unnecessary ones, optionally without user's complicated environment setting, in the invention.

The initialization information of each of said at least one retrieval section may further include information concerning information layer level of data to be transmitted from the main processing section to said each of said at least one retrieval section when activating said each of said at least one retrieval section and information layer level of data to be answered from said each of said at least one retrieval section.

Therefore, retrieval sections having a various functions can be selected and applied at the same time, and a supplemental development of a new additional function is enabled even after the delivering of the front-end processor.

BRIEF DESCRIPTION OF THE DRAWINGS

The foregoing, further objects, features, and advantages of this invention will become apparent from a consideration of the following description, the appended claims, and the accompanying drawings wherein the same numerals indicate the same or the corresponding parts.

FIG. 2 illustrates an example of contents of initialization information transmitted to initialization means 7 from notification means 10 of FIG. 1;

FIG. 4 illustrates an example of contents of initialization information applied in the embodiment of FIG. 3; and FIG. 5 is a flowchart illustrating deployment of the front-end processor of FIG. 1 and FIG. 3.

DETAILED DESCRIPTION OF THE PREFERRED EMBODIMENTS

Now, embodiments of the present invention will be described in connection with the drawings.

Figure 1:
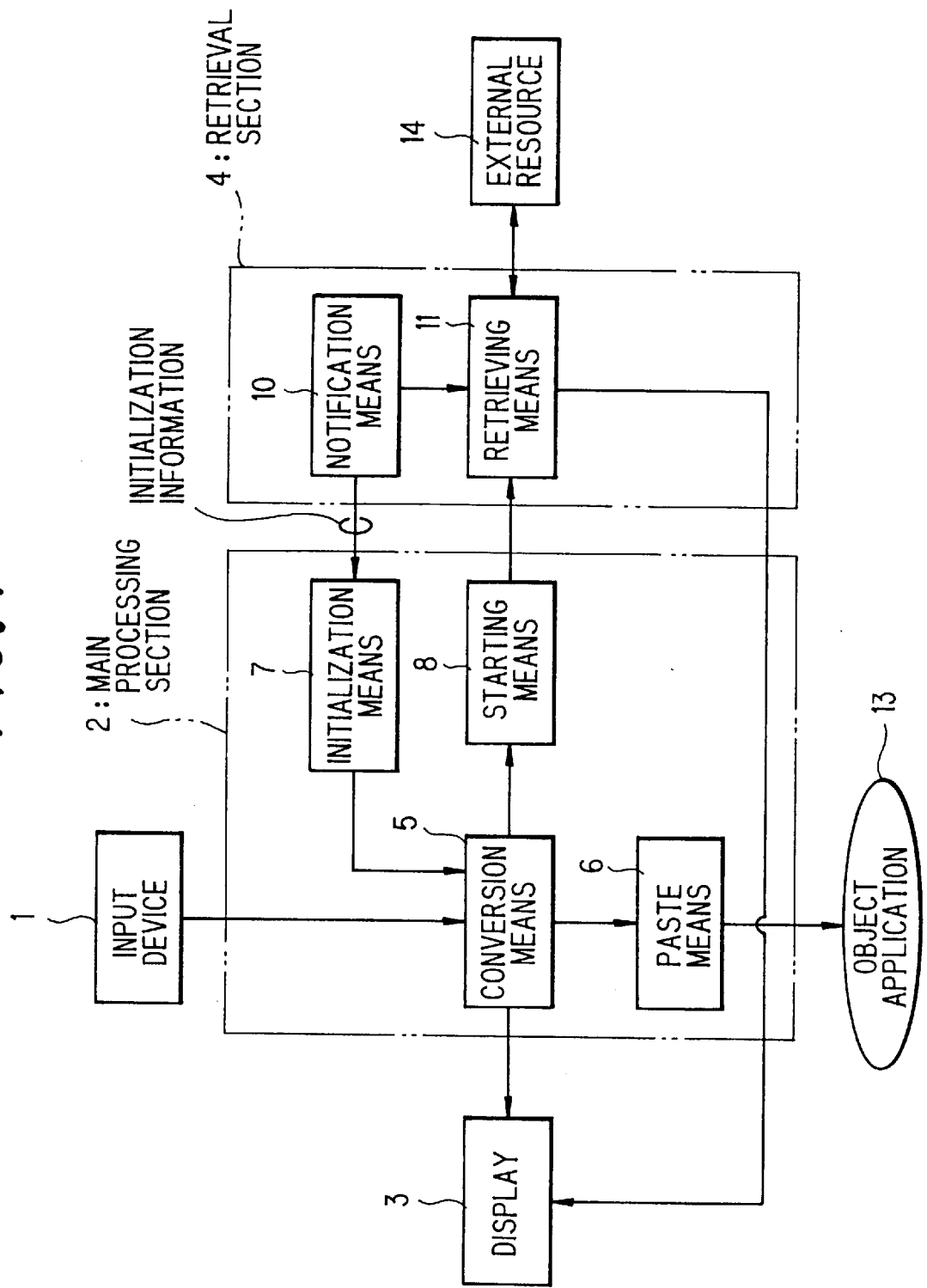
FIG. 1 is a block diagram illustrating a front-end processor according to an embodiment of the invention.

FIG. 1 is a block diagram illustrating a front-end processor according to an embodiment of the invention, having a main processing section 2 and a retrieval section 4.

The main processing section 2 comprises:

conversion means 5 for converting input code strings supplied through an input device 1 into character code strings according to a user's selection indicated by way of a user interface including a display 3, paste means 6 for pasting up the character code strings converted from the input code strings by the conversion means 5 on an object application 13, initialization means 7 for initially setting environments, such as starting key or start icon, for the retrieval section 4, according to initialization information transmitted from the retrieval section 4, and starting means 8 for activating the retrieval section 4 controlled by the conversion means 5.

The retrieval section 4 comprises:

notification means 10 for transmitting the initialization information to the main processing section 2, and retrieving means 11 for retrieving an external resource 14 according to indication delivered from the starting means 8.

The main processing section 2 operates mainly as a character converter, a Japanese character converter for example, on a platform provided specially for the front-end processor in an OS, and the input code strings from the input device 1 and the character code strings to be pasted up on the object application 13 are exchanged between the OS and the main processing section 2 by way of the platform, while the retrieval section 4, retrieving the external resource 14 making use of a device driver of the OS, communicates directly with the main processing section 2.

Here, it is to be noted that there may be provided more than one retrieval sections, each of which is prepared for communicating with the same main processing section and retrieving each of more than one external resources, a synonymous dictionary and an on-line-help database, for instance. In FIG. 1, at least one retrieval section and at least one corresponding external resources are represented with the retrieval section 4 and the external resource 14, respectively, and further, the embodiment will be described supposing that program files of these at least one retrieval section are prepared in a specific directory of a tree-structural filing system.

FIG. 5 is a flowchart illustrating deployment of the front-end processor of FIG. 1.

Referring to FIG. 5, the main processing section 2 is deployed in a main memory area of a computer following to the OS (at steps S1 and S2) in the same way with ordinary front-end processors. When the main processing section 2 is deployed, it searches and deploys every retrieval section 4 filed in the specific directory (at step S3). When the retrieval section 4 is deployed, the notification means 10 of the retrieval section 4 are started and transmit the initialization information to the initialization means 7 of the main processing section 2 (at step 4).

In the initialization information, there are included a default key code of start key of the retrieving means 11, bit map data of start icon thereof, and function name of the external resource 14 to be displayed on the display 3 when a user customizes key assignment, for example.

Figure 2:
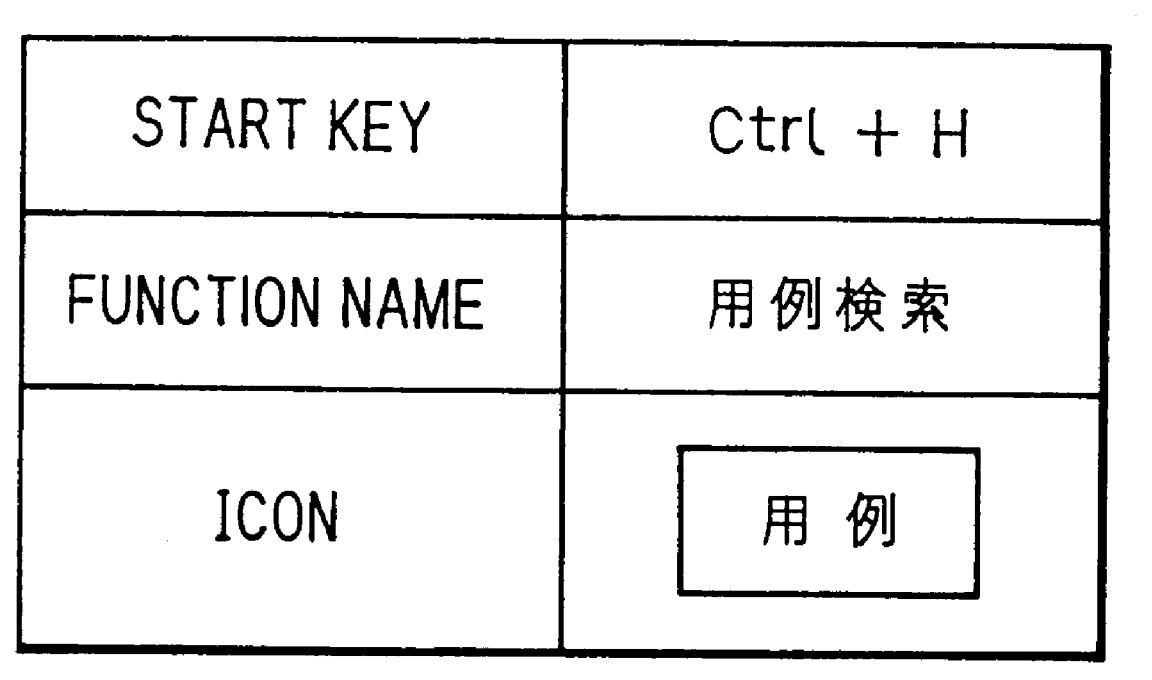

FIG. 2 illustrates an example of contents of the initialization information transmitted to the initialization means 7 from the notification means 10, of a retrieval section 4 prepared for retrieving a database of wording examples of homophones. In the initialization information of FIG. 2, a key code 'Ctrl+H', namely '08' in the hexadecimal code, is defined as the default start key of the database, which is followed by Japanese character code strings expressing '用例検索' ('WORDING EXAMPLE RETRIEVAL') to be used as the function name and bit map data for drawing a start icon 用例 of the database. They will be 'Ctrl+S', '同義語 検索' ('SYNONYM RETRIEVAL') and 同義語, in case of a retrieval section 4 applied for retrieving a synonymous dictionary, for example.

Returning to FIG. 5, the initialization means 7 performs registration of the default start key, the function name and the start icon transmitted in the initialization information, into a main memory area assigned for the front-end processor (at step 5).

When there is left another retrieval section filed in the specific directory, steps from S3 to S5 are repeated in the same way until all the retrieval sections are searched and deployed.

Then, the main processing section 2 puts up (at step S6) its own icon on the display 3 and waits to be activated by clicking the icon, residing in the main memory.

Thus, the deployment of the main processing section 2 and the retrieval section(s) 4 is accomplished at every boot of the computer in the embodiment of FIG. 1, simply installing file(s) of the desired retrieval section(s) 4 in the specific directory, without any intricate environment setting by the user, since it is performed automatically according to each initialization information prepared in each file of the retrieval section(s) 4.

Heretofore, files of the retrieval sections 4 are described to be installed in a specific directory for their identification by the main processing section 2. However, they may be identified in any appropriate way, by a specific extension of their file names or making use of an initialization file specifying file names to be deployed by the main processing section 2, for instance.

Now, a usage of the front-end processor of FIG. 1 is described in connection with the example having a main processing section 2 prepared for Japanese character conversion and the retrieval section 4, having the initialization information of FIG. 2, provided for retrieving the database of wording examples for homophones prepared as the external resource 14.

When a user intends to input Japanese phrases, he presses a start key, 'Alt+~', for instance, or clicks a start icon assigned for the front-end processor, which is recognized by the OS and user's input information entered through the input device 1, namely, input character codes and mouse operation information, is controlled to be supplied to the conversion means 5 of the main processing section 2 activated through the platform of the OS prepared for the front-end processor, in the same way with conventional front-end processor, until the main processing section 2 is disabled by entering an end key, generally the same with the start key, or by clicking an end icon to be recognized by the conversion means 5.

When the main processing section 2 is thus activated, the conversion means 5 arranges its own user interface, functional icons, for instance, on the display 3 together with the start icon(s) for the retrieval section(s) 4 referring to the initialization information registered in the main memory area.

The user enters syllables of the intending Japanese phrases with an alphabet code string. The conversion means 5 analyze and divide the alphabet code string into phrases (as there is no spacing between Japanese words or phrases). Then, the conversion means 5 represent Japanese homophones corresponding to each of the phrases analyzed of the alphabet code string as candidates among which the user selects an intending Japanese phrase to be input, phrase by phrase.

In case the user is perplexed to select the correct wording for a Japanese phrase, for example, he presses the start key, 'Ctrl+H', or clicks the start icon of the retrieval section 4 prepared for retrieving the database of wording examples. The conversion means 5 recognize the start key or the clickings referring to the initialization information registered in the main memory area and activate the retrieving means 11 of the retrieval section 4, transmitting data of homophones of the current converting phrase thereto by way of the starting means 8. The retrieving means 11 retrieves wording examples of the homophones in the external resource 14, that is, the wording example database, using each of the homophones as a retrieval key, and lists them on the display 3. Referring the list of wording examples thus displayed, the user of the embodiment of FIG. 1 selects a correct Japanese phrase to be input.

When all phrases of the entered alphabet code string are converted into corresponding Japanese phrases, they are confirmed by the user and pasted up on the object application 13 by the paste means 6.

In case the user intends to customize user interface of the front-end processor of FIG. 1, the contents of the initialization information of the retrieval section(s) 4, registered in the main memory area assigned for the purpose, is displayed on the display 3 in connection with each function name of the retrieval section(s) 4 together with user interface of the main processing section 2, to be revised by the user. When the start key of a retrieval section 4 is customized from 'Ctrl+H' to 'Alt+H', for example, and the user intends the customized information to be saved, it is recorded in a configuration file for the main processing section 2 in connection with the function name of the corresponding retrieval section 4, which is to be read out and referred to with the function name by the main processing section 2 after deployment of the retrieval section(s) 4 performed at booting of the computer, in the embodiment. The customized information may be reflected directory to the initialization information in the file of the corresponding retrieval section 4.

Figure 3:
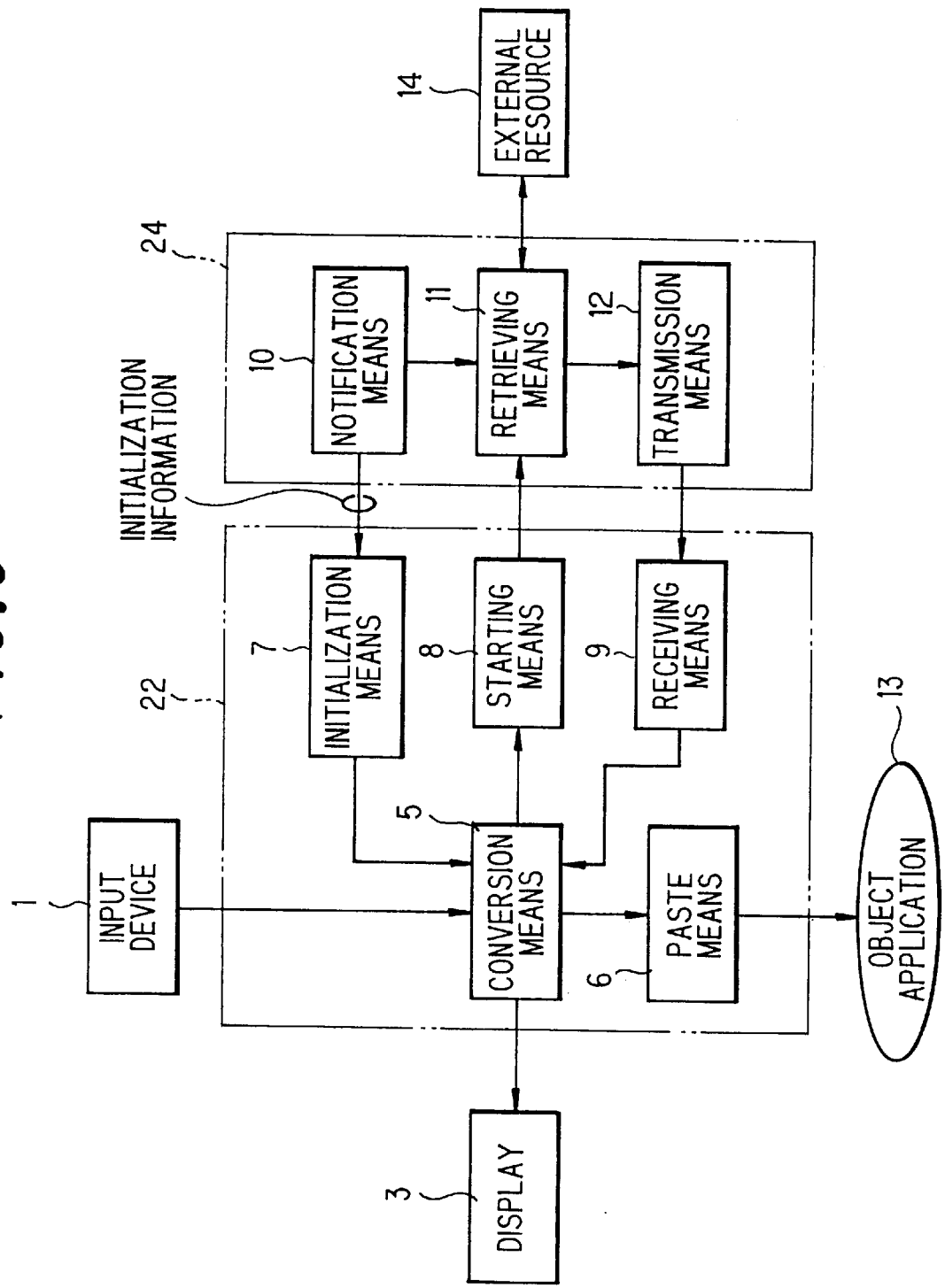
FIG. 3 is a block diagram illustrating another embodiment of the invention.

Now, another embodiment of the invention is described referring to a block diagram of FIG. 3 illustrating another front-end processor having a main processing section 22 and a retrieval section 24.

The main processing section 22 of FIG. 3 comprises receiving means 9 for receiving retrieval results of the retrieval section 24 in additionto configuration of the main processing section 2 of FIG. 1, while the retrieval section 24 comprises transmission means 12 for transmitting the retrieval results to the receiving means 9 in addition to configuration of the retrieval section 4 of FIG. 1. The same or corresponding parts of the embodiment of FIG. 3 to those of the embodiment of FIG. 1 are denoted with the same numerals, and the duplicated description is omitted.

The main processing section 22 and the retrieval section 24 are deployed in a main memory area, and initialization information is transmitted from the notification means 10 to the initialization means 7, in the same way as described in connection with steps S1 to S4 of FIG. 5, also in the embodiment of FIG. 3.

Compared to the initialization information transmitted in the embodiment of FIG. 1, following information is further included in the initialization information transmitted from the notification means 10 of the retrieval section 24:

an information layer level of data to be supplied to the retrieving means 11 for retrieving the external resource 14 (such as a character string, a word, a word with its part of speech, a sentence, etc.), a return flag indicating whether answer data are required or not, and an information layer level of data to be answered, when they are required (such as a word, a candidate list of a word, a sentence, or a candidate list of a sentence).

For example, "a word with its part of speech" is designated for retrieving a Japanese/English dictionary and "a sentence" is notified as the information layer level of the answer data in case of a database retrieval of idiomatic expression examples.

The initialization means 7 of the main processing section 22 register the information layer level of data to be transmitted from the starting means 8 to the retrieving means 11, that of data to be returned from the transmission means 12 to the receiving means 9 and the return flag in the memory area to be referred to by the conversion means 5 together with information of the default start key, the function name and the start icon, according to the initialization information.

This registration of initialization information is performed individually for each of the retrieval section(s) 24, and data communication between the main processing section 22 and each of the retrieval section(s) 24 is performed referring to the initialization information registered for each.

Therefore, a various interfaces can be defined for a various additional functions in the embodiment of FIG. 3, enabling a supple development of a new additional function even after delivering of the front-end processor, while there can not be applied but a fixed interface in the conventional arts or in the embodiment of FIG. 1, wherein data to be supplied are fixed to 'a candidate (homophone) list of a phrase' and the retrieval result is only represented on the display 3.

In the following paragraphs, usage and merits of the embodiment is described by way of an example of the main processing section 22 used for Japanese/English translation and the retrieval section 24 prepared for retrieving a database of idiomatic expression examples as the external resource 14.

At a boot of a computer, the retrieval section 24 is deployed together with other retrieval sections, retrieval section for retrieving a Japanese/English dictionary and that for retrieving a thesaurus, for example, in the same way as described in connection with FIG. 2. When the retrieval section 24 is deployed, initialization information as illustrated in FIG. 4 is transmitted from the notification means 10 to the initialization means 7, wherein a start key 'Ctrl+E', a function name ' 慣用例 文検索 (IDIOMATIC EXPRESSION EXAMPLE RETRIEVAL)', a start icon '慣用', an input information layer level 'a sentence with each part of speech of words therein' and an output information layer level 'a sentence' are defined.

Receiving the initialization information, the initialization means registers it in the main memory area to be referred to by the conversion means 5, where initialization information for the other retrieval section, prepared for retrieving a thesaurus, for instance, is also registered, such as a start key='Ctrl+T', a function name=' 同義語 検索 (THESAURUS RETRIEVAL)', a start icon=' 同義語 ', an input information layer level='a word' and an output information layer level='a word'.

When a user intends to input an English translation of a Japanese idiomatic sentence, he activates the main processing section 24 by pressing its start key, 'Alt+~' and enters an alphabet code string, "karegaaburawouru", for example, through the input device 1, of which a morphemic analysis is performed by the conversion means 5 and a Japanese sentence ' 彼<HE/pronoun>が</article indicating subject>を<COOKING OIL/noun> 売</article indicating object>る<SALES/verb>' is obtained.

By user's pressing of the start key 'Ctrl+E' of the retrieval section 24, it is activated and data of the Japanese sentence is supplied from the starting means 8 to the retrieving means 11 together with each part of speech of words therein, in accordance with the initialization information registered for the retrieval section 24. The retrieving means 11 retrieves the external resource 14, namely the database of idiomatic expression examples, making use of the data supplied as a retrieval key.

Data of the retrieval result are answered from the transmission means 12 to the receiving means 9, which replaces the Japanese sentence under processing of the conversion means 5 entirely with the data of the retrieval result, in accordance with the initialization information indicating the output information layer level is 'a sentence'. Thus, an English translation "He idles away his time." is displayed on the display 3.

When the retrieval result is confirmed by the user through the input device 1, it is pasted up on the object application 13 by the paste means 6. The retrieval result may be modified by the user with key inputs by way of the input device 1, or the user may activate a thesaurus retrieval section by pressing its start key 'Ctrl+T' pointing a word "idles" with a mouse cursor, for example. In the case, the word "idles" is transferred to the retrieving means 11 of the thesaurus retrieval section in accordance with the initialization information registered for the thesaurus retrieval section indicating the input information layer level is 'a word'. Then a synonym selected by the user among the retrieval results such as 'wastes', 'dissipates', etc., is answered to the receiving means 9 and replaced with the word 'idles', in accordance with the initialization information indicating the output information layer level is 'a word'.

As above described, various retrieving sections having various functions can be easily selected to be applied for one main processing section, in the embodiment, simply installing desired files of the retrieving sections in the same specific directory, or deleting unnecessary one from the directory, for example. Furthermore, a supplemental development of a new additional function is enabled even after the delivering of the front-end processor, instead of developing the front-end processor provided with all considerable additional functions a priori.

Heretofore, embodiments of the present invention are described in connection with some examples, but it can be easily understood that a various applications, such as application for an on-line-help or a spell checker, can be embodied in the same scope of the invention.

What is claimed is:

1. A front-end processor having a main processing section and at least one retrieval section controlled through the main processing section, comprising:

notification means provided in each of said at least one retrieval section for transmitting initialization information to the main processing section when a file of said each of said at least one retrieval section is deployed in a main memory area of a computer; and initialization means provided in the main processing section for initializing default environments of the front-end processor according to said initialization information transmitted from each of said at least one retrieval section, wherein said at least one retrieval section is filed in a specific directory to be identified and deployed by the main processing section.

2. A front-end processor having a main processing section and at least one retrieval section controlled through the main processing section, comprising:

notification means provided in each of said at least one retrieval section for transmitting initialization information to the main processing section when a file of said each of said at least one retrieval section is deployed in a main memory area of a computer; and initialization means provided in the main processing section for initializing default environments of the front-end processor according to said initialization information transmitted from each of said at least one retrieval section, where said initialization information of each of said at least one retrieval section including information concerning:

a start key to be entered through an input device of the computer for the main processing section activating said each of said at least one retrieval section;

bit map data of an icon to be clicked by an pointing device of the computer for the main processing section activating said each of said at least one retrieval section; and a function name to be displayed for identifying said each of said at least one retrieval section.

3. A front-end processor recited in claim 2, said initialization information of each of said at least one retrieval section further including information concerning information layer level of data to be transmitted from the main processing section to said each of said at least one retrieval section when activating said each of said at least one retrieval section, and information layer level of data to be answered from said each of said at least one retrieval section.

4. A front-end processor recited in claim 1, wherein said specific directory is a directory of a tree-structural filing system.

5. A front-end processor having a main processing section and at least one retrieval section controlled through the main processing section, comprising:

notification means provided in each of said at least one retrieval section for transmitting initialization information to the main processing section when a file of said each of said at least one retrieval section is deployed in a main memory area of a computer; and initialization means provided in the main processing section for initializing default environments of the front-end processor according to said initialization information transmitted from each of said at least one retrieval section, wherein said at least one retrieval section is filed with a specific extension name in a filing system to be identified and deployed by the main processing section.

* * * * *